United States Patent [19]

Sugawara

[11] Patent Number: 5,160,192
[45] Date of Patent: Nov. 3, 1992

[54] ILLUMINATING INSTRUMENT

[75] Inventor: Saburo Sugawara, Yachiyo, Japan

[73] Assignee: Asahi Kogaku Kogyo Kabushiki Kaisha, Tokyo, Japan

[21] Appl. No.: 701,579

[22] Filed: May 14, 1991

Related U.S. Application Data

[63] Continuation of Ser. No. 323,882, Mar. 15, 1989, abandoned.

[30] Foreign Application Priority Data

Mar. 16, 1988 [JP] Japan .................. 63-63812
Mar. 16, 1988 [JP] Japan .................. 63-63813

[51] Int. Cl.$^5$ ............................... G03B 15/02
[52] U.S. Cl. ........................ 362/16; 362/309; 362/328; 362/333; 362/346; 354/126
[58] Field of Search ............. 362/3, 11, 16, 17, 346, 362/349, 350, 296, 297, 298, 308, 309, 326, 328, 333, 334, 335, 336, 337, 338; 354/126

[56] References Cited

U.S. PATENT DOCUMENTS

| | | | |
|---|---|---|---|
| 2,748,263 | 5/1956 | Franck et al. | 362/333 |
| 2,877,342 | 3/1959 | Beach | 362/333 |
| 4,066,887 | 1/1978 | Levis | 362/346 |
| 4,120,018 | 10/1978 | Nagel | 362/338 |
| 4,158,222 | 6/1979 | Cook | 363/333 |
| 4,190,880 | 2/1980 | Esaki | 362/16 |
| 4,234,906 | 11/1980 | Schindler | 354/126 |
| 4,300,831 | 11/1981 | Isago | 362/16 |
| 4,304,479 | 12/1981 | Van Allen | 362/16 |
| 4,356,538 | 10/1982 | Plummer | 362/16 |
| 4,616,294 | 10/1986 | Tenmyo | 362/18 |
| 4,690,141 | 9/1987 | Castal et al. | 350/452 |
| 4,754,381 | 6/1988 | Downs | 362/297 |
| 4,823,246 | 4/1989 | Dilouya | 362/336 |
| 4,914,747 | 4/1990 | Nino | 362/297 |
| 4,920,368 | 4/1990 | Arai et al. | |
| 4,945,455 | 7/1990 | Akizuki | 362/346 |

FOREIGN PATENT DOCUMENTS

| | | | |
|---|---|---|---|
| 952918 | 11/1956 | Fed. Rep. of Germany | 362/346 |
| 399823 | 11/1942 | Italy | 350/452 |
| 127536 | 10/1980 | Japan | 362/16 |
| 0118304 | 5/1987 | Japan | 350/452 |
| 62-211627 | 9/1987 | Japan . | |
| 121294 | 6/1989 | Japan . | |
| 282255 | 12/1927 | United Kingdom | 362/350 |
| 327630 | 4/1930 | United Kingdom | 362/333 |
| 569552 | 5/1945 | United Kingdom | 362/333 |

Primary Examiner—Stephen F. Husar
Attorney, Agent, or Firm—Sandler, Greenblum & Bernstein

[57] ABSTRACT

In an illuminating instrument, a reflector is composed of a combination of two ellipses whose respective optical axes are spaced from each other in a cross-sectional plane containing an optical axis of an illuminating optical system. A light source has its center located between the optical axes of the respective ellipses. A condenser is arranged at an opening of the reflector.

23 Claims, 7 Drawing Sheets

ILLUMINATING INSTRUMENT

This application is a continuation of application Ser. No. 07/323,882, filed Mar. 15, 1989, now abandoned.

BACKGROUND OF THE INVENTION

This invention relates to illuminating instruments that reduce orientation nonuniformity and, more particularly, to an illuminating instrument that is optimal as an electronic flash unit for cameras or the like.

The assignee of this invention has proposed an electronic flash unit shown in FIG. 1 in Japanese Patent Application No. SHO 61-55742 (corres. to Japanese Patent Provisional Publication No. SHO 62-211627). The electronic flash unit comprises a semi-cylindrical reflector 13, and an elongated cylindrical flashing tube 17 arranged at a focal point of the reflector 13. A convex Fresnel lens 15 is arranged at an opening of the semi-cylindrical reflector 13. In the above electronic flash unit, the reflector 13 has a cross-sectional configuration which consists of an ellipse defined by the following equation:

$$x = y^2/R[1 + \{1 - (1+k)y^2/R^2\}^{\frac{1}{2}}]$$

where k is a conical constant representative of the elliptic configuration of the reflector 13, and R is a radius of curvature of a reference spherical surface representative of an elliptic configuration pattern of the reflector 13. When it is supposed that an opening length of the reflector 13 in a cross-sectional plane perpendicular to an optical axis O of the reflector 13 and to an axis of the flashing tube 17 is D, an index of refraction n of the convex Fresnel lens 15 is equal to 1.4 through 2.0 and an illuminating angle $\theta$ is within a range of from $\pm 15°$ to $45°$, a focal length f of the convex Fresnel lens 15, a depth Dp of the reflector 13, a spacing Fp between an apex of the reflector 13 and the focal position thereof, the constant k and the radius of curvature R are within ranges expressed by the following inequalities (1), (2), (3), (4) and (5):

$$1.5D < f < 3D \tag{1}$$

$$-1 < k < -0.4 \tag{2}$$

$$D/10 < R < D/2 \tag{3}$$

$$0.4D < Dp < 1.2D \tag{4}$$

$$D/20 < Fp < D/3 \tag{5}$$

With the arrangement described above, it is possible to form the reflector 13 so as to have the depth reduced, whereby the entire electronic flash unit can be miniaturized.

In the electronic flash unit constructed as above, however, the following problem has later been found. That is, as indicated by the broken line in a light distribution characteristic diagram shown in FIG. 2, the light quantity emitted in the vicinity of the optical axis O is reduced as compared with that in other directions, so that an uneven or nonuniform light distribution characteristic appears. According to an explanation of the inventors of this application, this is because "eclipse" occurs due to the flashing tube 17 per se. An influence of this phenomenon is remarkable if the front opening of the reflector 13 is small. The term "eclipse" does mean that light does not contribute to a condensing action due to any obstruction. The broken line in FIG. 1 indicates an example of light rays lacking due to "eclipse".

SUMMARY OF THE INVENTION

It is therefore an object of this invention to provide an improved illuminating instrument which is small in size, high in condensing efficiency and lower in light distribution nonuniformity, and which has universality.

For the above purpose, according to the invention, there is provided an illuminating instrument comprising:

a reflector composed of a combination of two ellipses whose respective optical axes are spaced from each other in a cross-sectional plane containing an optical axis of an illuminating optical system;

a light source having a center thereof located between the optical axes of the respective ellipses; and a condenser arranged at an opening of the reflector.

Preferably, the optical axes of the respective ellipses extend parallel to each other, and a distance l between the optical axes of the respective ellipses satisfies the following condition with respect to a diameter P of a light-emitting section of the light source:

$$0.2P < l < 2P \tag{6}$$

Further, the invention adopts advantages of the arrangement described in the Background of the Invention of this specification, and provides also an improved electronic flash unit that is the principal subject of this invention. In this case, the condenser employs a convex Fresnel lens.

With the arrangement according to the invention described above, the possibility is reduced that light rays of the light reflected by the reflector along the optical axis of the illuminating optical system is influenced by "eclipse" due to the light source per se. Accordingly, the nonuniform light distribution characteristic indicated by the broken line in FIG. 2 can be corrected or reformed to the uniform one indicated by the solid line in FIG. 2.

BRIEF DESCRIPTION OF THE ACCOMPANYING DRAWINGS

DESCRIPTION OF THE EMBODIMENTS

Figure 1:
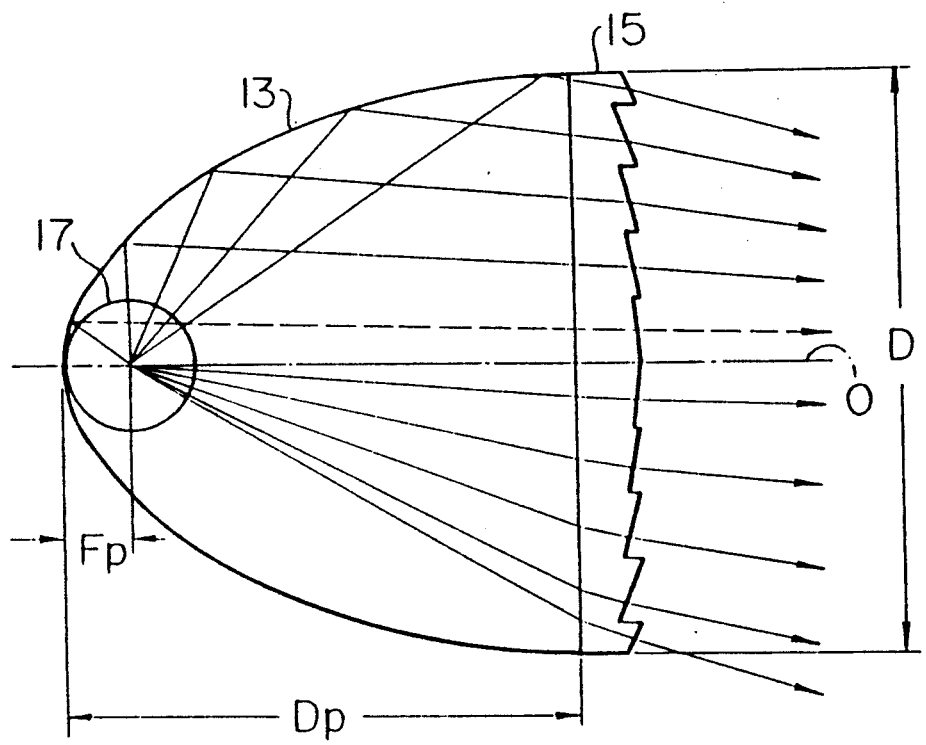
FIG. 1 is a diagrammatic cross-sectional view of an electronic flash unit proposed in the prior Japanese application filled in the name of the same assignee as this invention.
Figure 3:
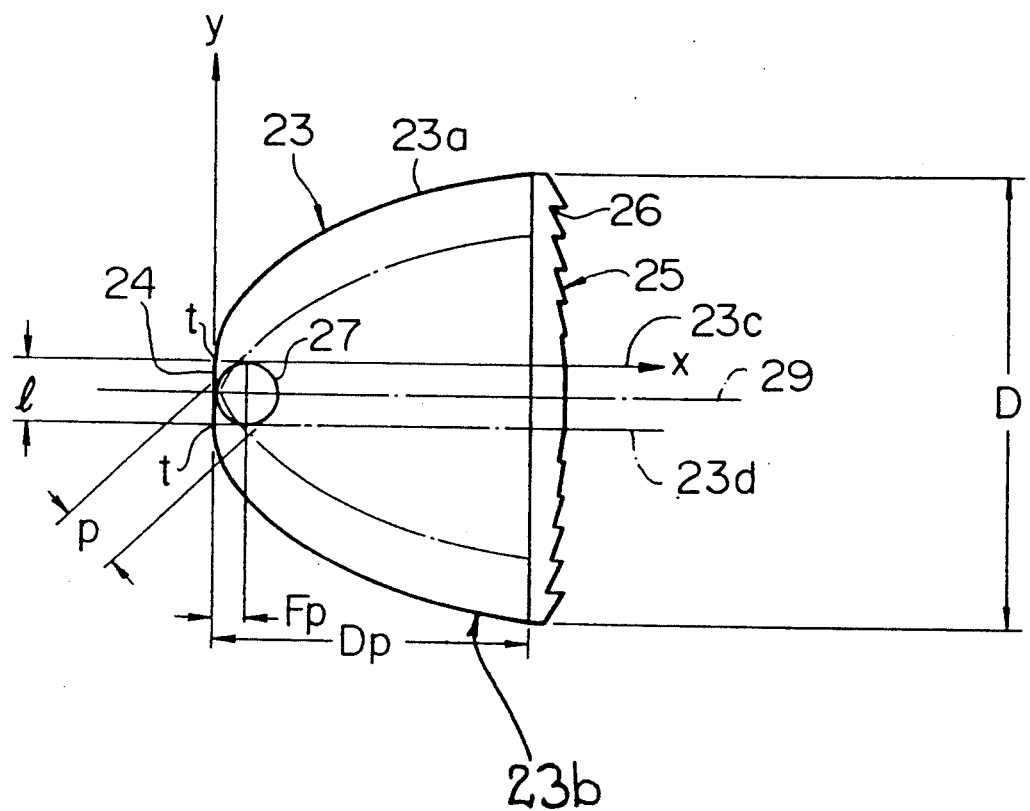
FIG. 3 is a diagrammatic cross-sectional view of an illuminating instrument embodying the invention.
Figure 4:
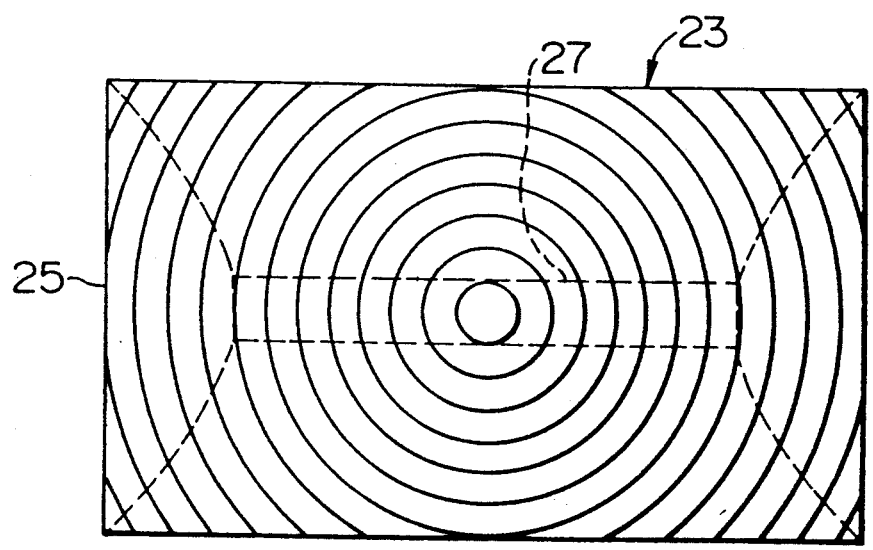
FIG. 4 is a front elevational view of the illuminating instrument illustrated in FIG. 3.

Referring first to FIGS. 3 and 4, there is shown in diagrammatic cross-section an illuminating instrument embodying the invention. The illuminating instrument comprises a reflector 23 having a substantially semi-cylindrical shape in which two identical ellipses 23a and 23b having their respective optical axes 23c and 23d are combined with each other in a cross-sectional plane including an optical axis 29 of an illuminating optical system. Both the ellipses 23a and 23b can be expressed by the following equation, similarly to the reflector 13 illustrated in FIG. 1:

$$x = y^2/R[1 + \{1 - (1+k)y^2/R^2\}^{\frac{1}{2}}]$$

where k is a conical constant representative of a configuration of each of the ellipses 23a and 23b, and R is a radius of curvature of a reference spherical surface representative of a configuration pattern of each of the ellipses 23a and 23b. The optical axes 23c and 23d of the respective ellipses 23a and 23b extend parallel to each other, and are spaced from each other by a spacing l. Both the ellipses 23a and 23b have their respective apexes t and t which are connected to each other by a linear section 24. An elongated cylindrical light source 27 such as, for example, a xenon lamp is arranged adjacent the straight section 24. The light source 27 has a diameter P which is equal to the spacing l. The light source 27 is so arranged that a central axis of the light source 27 coincides with the optical axis 29 of the illuminating optical system, and diametrical opposite side edges of the light source 27 in a direction perpendicular to the optical axis 29 and to the axis of the light source 27 coincide respectively with first focal points of the respective ellipses 23a and 23b.

A convex Fresnel lens 25 serving as a condenser is arranged at an opening of the reflector 23.

The convex Fresnel lens 25 is so arranged that Fresnel grooves 26 are formed on a front side of the convex Fresnel lens 25, that is, a side thereof opposite to the light source 27. This arrangement is advantageous in that "eclipse" due to the Fresnel grooves 26 is reduced as compared with such an arrangement that the Fresnel grooves are located on the side of the Fresnel lens facing toward the light source 27. The details of the arrangement of the Fresnel grooves are disclosed in the aforesaid Japanese Patent Application No. SHO 61-56742 (corres. to Japanese Patent Provisional Publication No. SHO 62-211627), and the arrangement of the Fresnel grooves is not part of the subject matter of this invention.

In the illuminating instrument illustrated in FIGS. 3 and 4, when the opening length of the reflector 23 in a plane perpendicular to the optical axis 29 of the illuminating optical system and to the axis of the light source 27 is D, an index of refraction n of the convex Fresnel lens 25 is equal to 1.4 through 2.0, and an illuminating angle $\theta$ is within a range of from $\pm15°$ to 45°, a focal length f of the convex Fresnel lens 25, a depth Dp of the reflector 23, a spacing Fp between the apex of the reflector 23 and a focal position of each of the ellipses 23a and 23b, the aforesaid constant k, the radius R and the spacing l are within ranges expressed by the following inequalities (11), (12), (13), (14) and (15):

$$1.5D < f < 3D \tag{11}$$

$$-1 < k < -0.4 \tag{12}$$

$$D/10 < R < D/2 \tag{13}$$

$$0.4D < Dp < 1.2D \tag{14}$$

$$D/20 < Fp < D/3 \tag{15}$$

It is desirable that the spacing l between the optical axes 23c and 23d of the respective ellipses 23a and 23b be equal to the diameter P of the light source 27. However, the invention is not limited to the fact that the spacing l and the diameter P are completely equal to each other. Experiments have come to the conclusion that the spacing l should satisfy the following condition:

$$0.2P < l < 2P$$

If the spacing l is equal to or less than 0.2P, the light distribution nonuniformity is not sufficiently eliminated. On the other hand, if the spacing l is equal to or larger than 2P, the reflector 23 becomes too large in size. This is contrary to the purpose of miniaturization.

Figure 2:
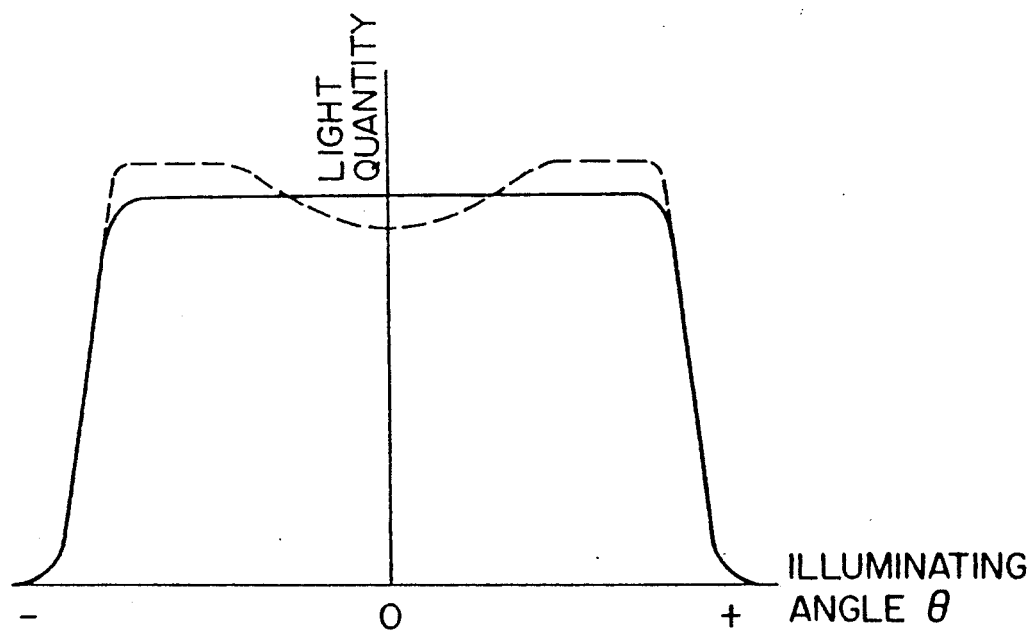
FIG. 2 is a graphical representation comparing the light distribution characteristics in an illuminating instrument embodying the invention with those of the electronic flash unit illustrated in FIG. 1.
Figure 5:
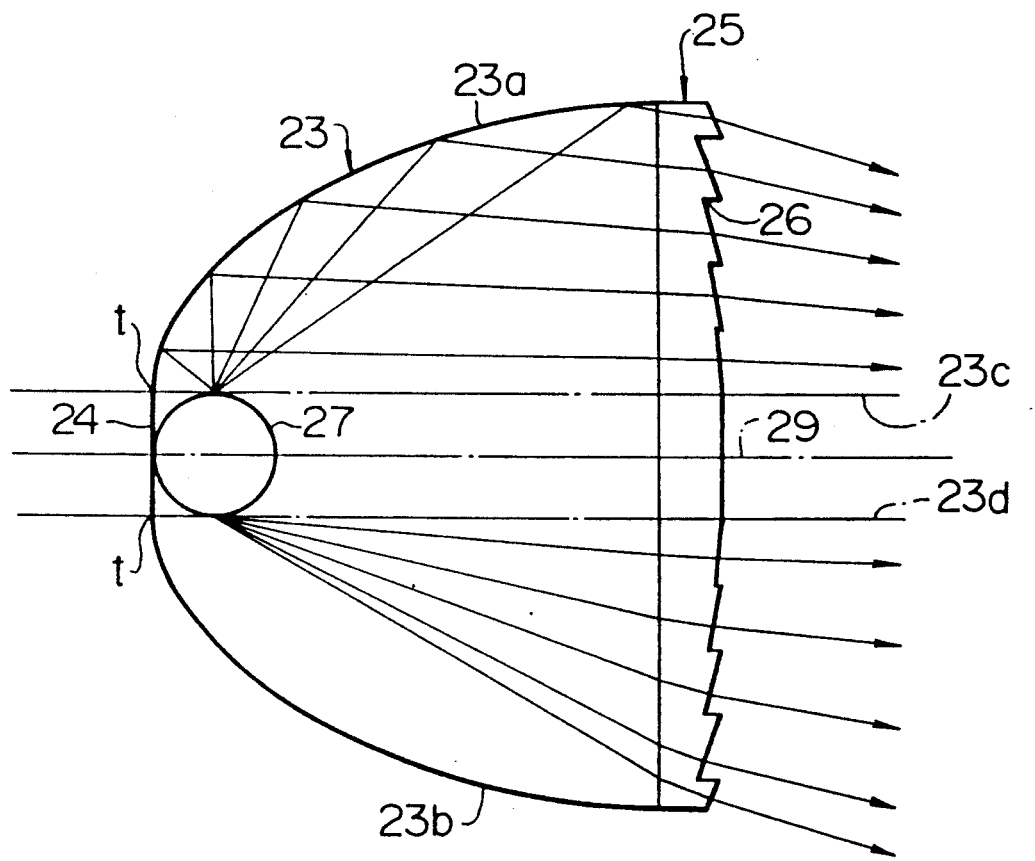
FIG. 5 is a view showing light rays in the illuminating instrument illustrated in FIGS. 3 and 4.

FIG. 5 shows a light-ray diagram of the embodiment illustrated in FIGS. 3 and 4. As shown in this figure, both the diametrical side edges of the light source 27 coincide respectively with the focal points of the respective ellipses 23a and 23b of the reflector 23, that is, l is equal to P, whereby no "eclipse" occurs in the light rays emitted along the optical axis 29 of the illuminating optical system. Thus, it is possible to obtain the uniform light distribution characteristic as indicated by the solid line in FIG. 2.

Figure 6:
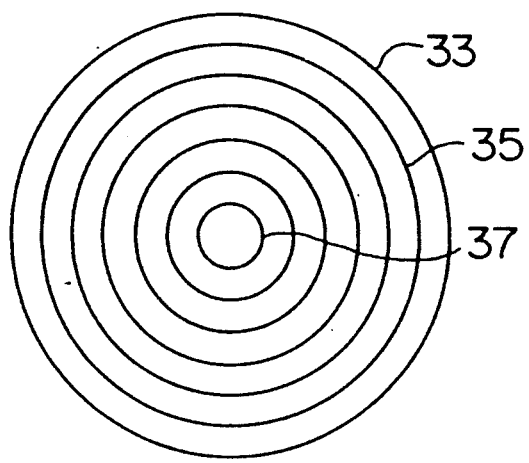
FIG. 6 is a front elevational view of a modified illuminating instrument in which a reflector and so on are arranged in relation to a symmetry of revolution about an optical axis of an illuminating optical system.

FIG. 6 shows a modified form of the illuminating instrument according to the invention. In this modification, a reflector 33, a condenser or a convex Fresnel lens 35, and a light source 37 are arranged in a concentric relation about an optical axis of an illuminating optical system or the reflector 33. By modifying the entire configuration as shown, for example, in FIG. 6, the invention can be applied not only to an electronic flash unit, but also to various illuminating instruments.

A desirable design example in the case where the illuminating instrument illustrated in FIGS. 3 and 4 or FIG. 6 is formed as an electronic flash unit is as follows:

$\theta = 22°$;
D = 11 mm;
f = 25 mm;
k = −0.881511;
R = 1.742 mm;
Dp = 7.972 mm;
Fp = 0.899 mm;
l = 2 mm; and
P = 2 mm.

In connection with the above, the depth Dp of the reflector 23 or 33 in the design example indicates a length from the apexes t and t of the respective ellipses 23a and 23b to the opening of the reflector 23 or 33.

Figure 7:
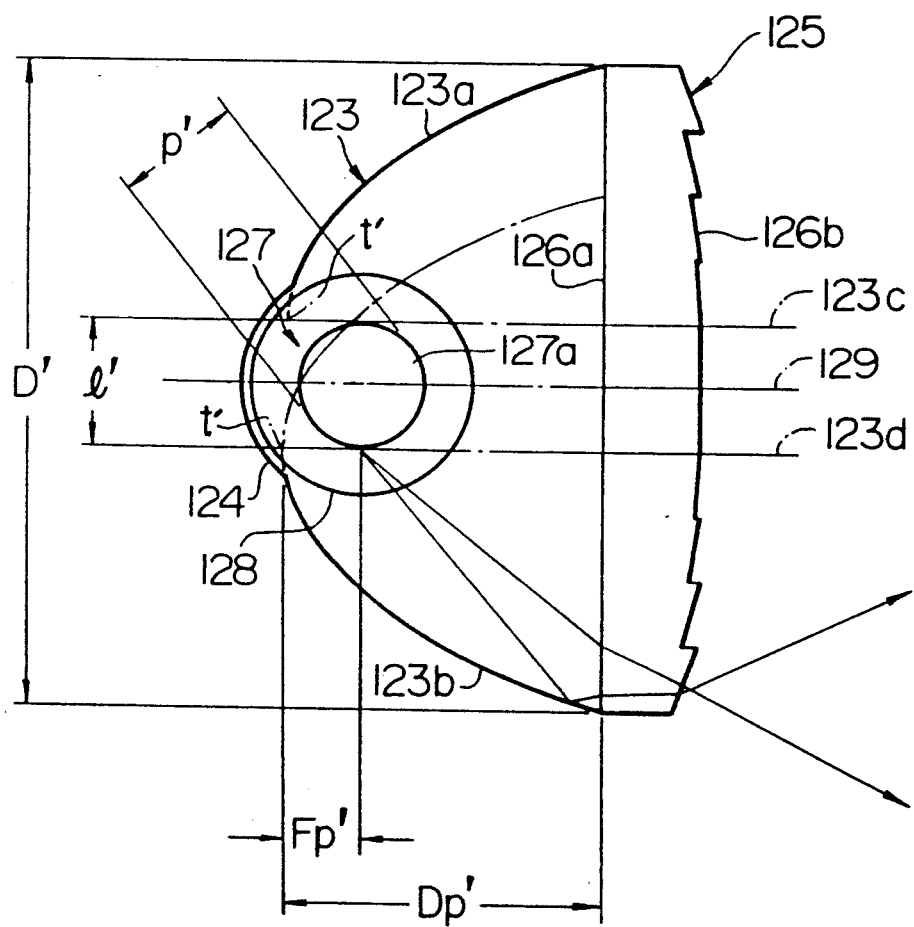
FIG. 7 is a view similar to FIG. 3, but showing still another modified illuminating instrument which is formed as an electronic flash unit.
Figure 8:
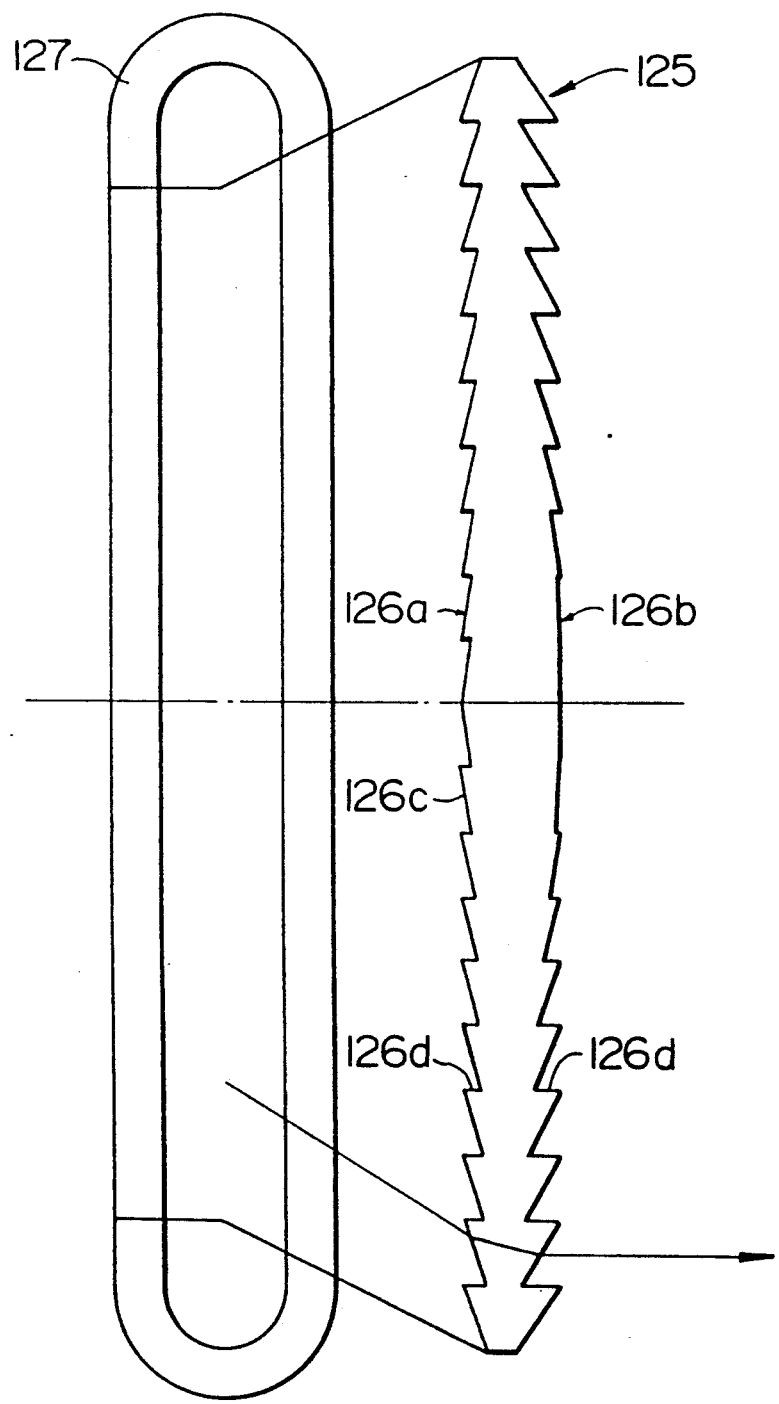
FIG. 8 is a diagrammatic cross-sectional view of the electronic flash unit illustrated in FIG. 7, in a plane containing an optical axis of a reflector and an axis of a flashing tube illustrated in FIG. 7.
Figure 9:
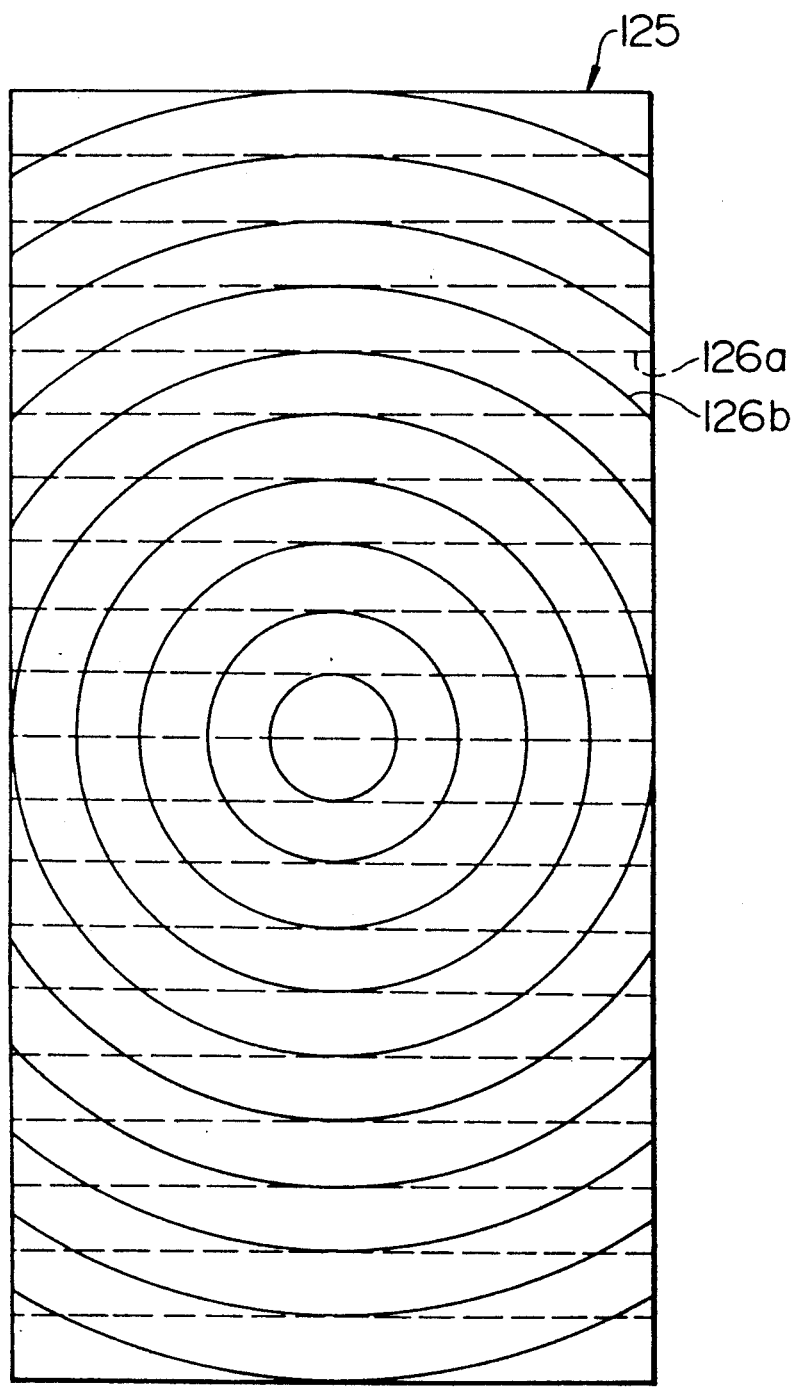
FIG. 9 is a front elevational view of the electronic flash unit illustrated in FIGS. 7 and 8.

Referring next to FIGS. 7 through 9, there is shown another modified form of the illuminating instrument according to the invention, which is formed as an electronic flash unit. Like the embodiment illustrated in FIGS. 3 and 4, a reflector 123 consists of a substantially semi-cylindrical configuration combining two identical ellipses 123a and 123b having their respective axes 123c and 123d, in a cross-sectional plane perpendicular to an optical axis 129 of an illuminating optical system or the reflector 123. The optical axes 123c and 123d of the respective ellipses 123a and 123b extend parallel to each other, and are spaced from each other by a spacing l'.

A cylindrical flashing tube 127 such as, for example, a xenon lamp is arranged at the deepest position of the reflector 123 in such a manner that an axis of the flashing tube 127 coincides with the deepest position of the reflector 123. The flashing tube 127 is composed of a central light-emitting tube 127a and a glass tube 128 surrounding the light-emitting tube 127a. The light-emitting tube 127a has a diameter equal to the spacing l'. A center of the light-emitting tube 127a coincides with the optical axis 129 of the flash unit. Further, the light-emitting tube 127a is so arranged such that both diametrical side edges of the light-emitting tube 127a in the direction perpendicular to the optical axis 129 and to the axis of the light-emitting tube 127a coincide respectively with the first focal points of the respective ellipses 123a and 123b. Accordingly, diametrically opposite side edges of the glass tube 128 in the direction perpendicular to the optical axis 129 and to the axis of the light-emitting tube 127a are located respectively beyond apexes t' and t' of the ellipses 123a and 123b. The apexes t' and t' of the respective ellipses 123a and 123b are connected to each other by a curved section 124 whose radius of curvature is identical with that of the glass tube 128.

A condenser 125 is arranged at an opening of the reflector 123. The entire rear side of the condenser 125, which faces toward the flashing tube 127, is formed into a lens surface (hereinafter referred to as "cylindrical convex Fresnel lens surface") 126a in which a plurality of Fresnel grooves are formed perpendicularly to the longitudinal axis of the flashing tube 127. The entire front side of the condenser 125, which faces toward a subject to be photographed, is formed into a concentric convex Fresnel lens surface 126b. In the cylindrical convex Fresnel lens surface 126a, the condensing action in the peripheral portion is stronger than that at the central portion. Each wedge-like condensing-action element 126c of the Fresnel lens surface 126a is small in angle at the center, but is large in angle at the peripheral portion. This angle is 10° at the center, and 20° in the peripheral portion, if the lateral light emitting angle, that is, the vertical light emitting angle of the flash unit as viewed in FIG. 7 is ±30°. The angle of the wedge-like condensing-action element 126c gradually increases from the center to the peripheral portion. The focal length f' of the concentric convex Fresnel lens surface 126b is set to 20 mm. An example of other numerical values is as follows:

Radius of curvature R of a reference spherical surface of each ellipse: R = 2.161 mm
Conical constant K of each ellipse: K = −0.771490
Depth Dp of the reflector 23: Dp = 5.052 mm
Spacing Fp between the apex of each ellipse and the focal position of the ellipse: Fp = 1.150 mm
Spacing l between the optical axes of the respective ellipses: l = 2 mm
Diameter P of the light-emitting tube 127a: P = 2 mm In the above-described electronic flash unit, the light rays from the flashing tube 127 condense as follows. That is, the light rays condense in the longitudinal direction of the flashing tube 127 under the influence of both the cylindrical convex Fresnel lens surface 126a and the concentric convex Fresnel lens surface 126b. The light rays condense in the direction perpendicular to the longitudinal direction, under the influence of the concentric convex Fresnel lens surface 126b. Accordingly, the flashing tube 127 can more closely approach the condenser 125, so that the depth of the reflector 123 can be made shallow.

Although in the above embodiment, the cylindrical convex Fresnel lens surface 126a and the concentric convex Fresnel lens surface 126b are separately formed on the opposed sides of the condenser 125, the combined configuration of the cylindrical convex Fresnel lens surface and the concentric convex Fresnel lens surface may, instead, be applied on a selected one of the opposed sides of the condenser 125.

Figure 10:
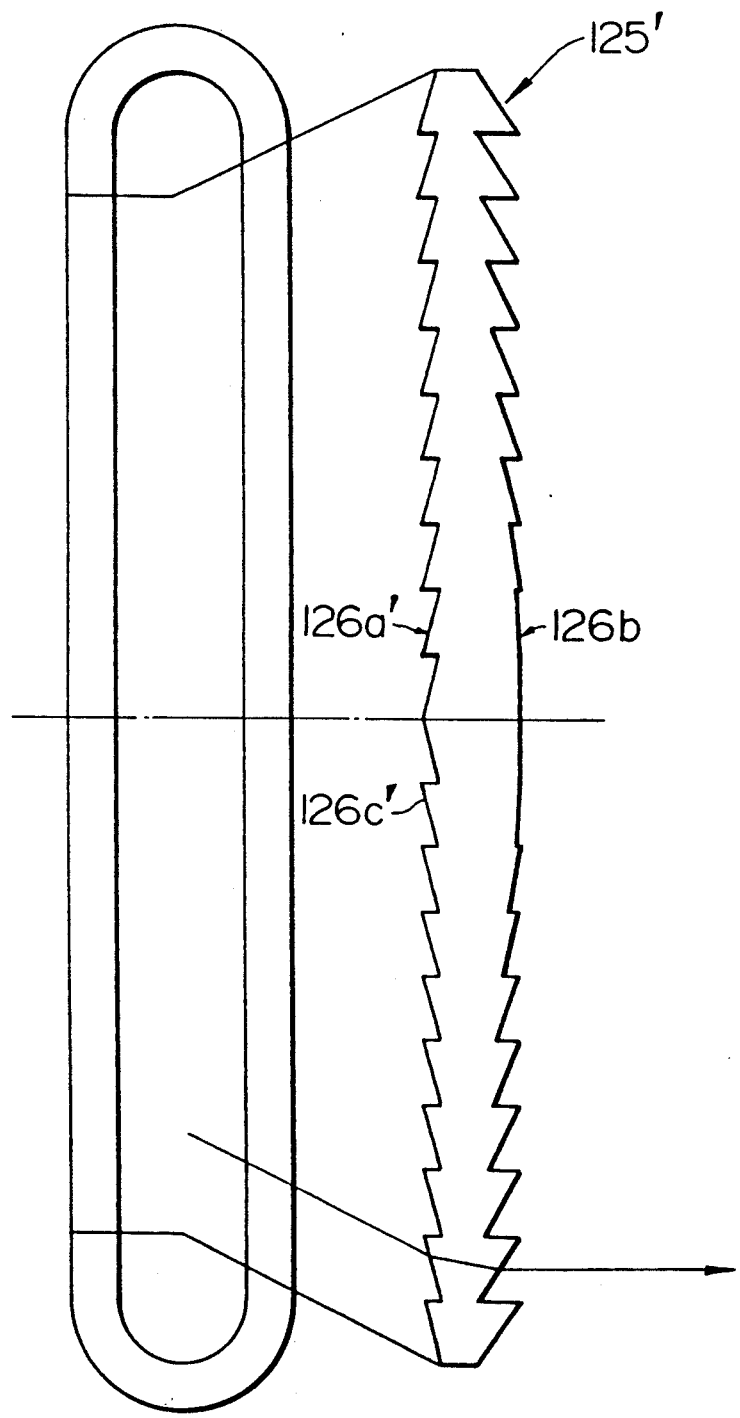
FIG. 10 is a view similar to FIG. 8, but showing a modified electronic flash unit.

FIG. 10 shows a modified form of the electronic flash unit according to the invention. In this modification, each groove in the cylindrical convex Fresnel lens surface 126a' is such that the angle of each wedge-like condensing-action element 126c' facing toward the flashing tube is constant (15° in the aforesaid design example). Other features and arrangements of this modification are the same as those of the modification illustrated in FIGS. 7 through 9. The condensing performance of the convex Fresnel lens surface 126a' is inferior as compared with that of the modification illustrated in FIGS. 7 through 9, but has an advantage in that processing of the condenser 125' is easy.

In the modifications illustrated in FIGS. 7 through 9 and FIG. 10, design is made such that the cylindrical convex Fresnel lens surface 126a or 126a' is located on the side of the flashing tube 127, while the concentric convex Fresnel lens surface 126b is located on the side opposite to the flashing tube 127. This is effective in maintaining the "eclipse" low due to steps 126d (see FIG. 8) of the Fresnel grooves. It is desirable that the cylindrical convex Fresnel lens surface 126a or 126a' is located on the side of the flashing tube 127, because step 126d of the cylindrical convex Fresnel lens 126a or 126a' is generally small.

According to the electronic flash unit illustrated in FIG. 7 through 9 or FIG. 10, the condenser 125 or 125' has, at its front and back sides, the cylindrical convex Fresnel lens surface 126a or 126a' and the concentric convex Fresnel lens surface 126b, respectively, whereby the condensing performance of the condenser 125 or 125' can be raised in every direction. Accordingly, the flashing tube 127 can approach the condenser 125 or 125'; that is, the depth of the reflector 123 can be made shallow, making it possible to miniaturize the entire flash unit.

What is claimed is:

1. An illuminating instrument comprising:
   a reflector composed of a combination of at least a part of two elliptic reflecting surfaces, each of said two elliptic reflecting surfaces being separated from each other by a predetermined interval perpendicular to the illuminating optical system optic axis;
   a light source arranged to be located on the illuminating optical system optic axis, said light source being located near a focal point of each of said elliptic reflecting surfaces; and
   a condenser arranged at an opening of said reflector.

2. The illuminating instrument according to claim 1, wherein the shapes of each of said elliptic reflecting surfaces are identical to each other, and light reflected by each of elliptic reflecting surfaces extends parallel to each other.

3. The illuminating instrument according to claim 2, wherein the a spacing l between said elliptic reflecting surfaces satisfies the following condition with respect to a diameter P of a light-emitting section of said light source:

$$0.2P < l < 2P.$$

4. The illuminating instrument according to claim 3, wherein said condenser includes a convex Fresnel lens.

5. The illuminating instrument according to claim 4, wherein said elliptic reflecting surfaces have a configuration in the cross-sectional plane containing the optical axis of said illuminating optical system, said configuration being defined as follows:

$$x = y^2/r[1 + \{1 - (1+k)y^2/r^2\}^{\frac{1}{2}}]$$

and wherein, when it is supposed that a length of said reflector in a plane perpendicular to said direction is D, an index of refraction n of said convex Fresnel lens is equal to 1.4 through 2.0 and an illuminating angle $\Theta$ is within a range of from ±15° to 45°, a focal length f of said convex Fresnel lens, a depth Dp of said reflector, a spacing Fp between an apex of said reflector and focal positions of the elliptic reflecting surfaces, a conical constant k representative of a configuration of each of said elliptic reflecting surfaces, a radius of curvature R of a reference spherical surface representative of a configuration pattern of said elliptic reflecting surfaces, and said spacing l satisfy the following inequalities:

$$1.5D < f < 3D;$$

$$-1 < k < -0.4;$$

$$D/10 < R < D/2;$$

$$0.4D < Dp < 1.2D; \text{ and}$$

$$D/20 < Fp < D/3.$$

6. The illuminating instrument according to claim 4, wherein said convex Fresnel lens has a side opposite to said light source, wherein only said side is formed with Fresnel grooves.

7. The illuminating instrument according to claim 1, wherein said elliptic reflecting surfaces respective apexes which are connected to each other by a linear section.

8. The illuminating instrument according to claim 1, wherein said reflector, said condenser and said light source are arranged in a concentric relation about the optical axis of said illuminating optical system.

9. The illuminating instrument according to claim 1, wherein said elliptic reflecting surfaces respective apexes which are connected to each other through a curved section.

10. The illuminating instrument according to claim 9, wherein said light source includes an elongated light-emitting tube and a glass tube surrounding said light-emitting tube, and wherein said curved section is identical in radius of curvature with said glass tube.

11. The illuminating instrument according to claim 1, wherein said condenser has front and back sides, one of said front and back sides being formed with a cylindrical convex Fresnel lens surface which functions to condense a light passing therethrough, in its longitudinal direction, and the other side being formed with a concentric Fresnel lens surface.

12. The illuminating instrument according to claim 11, wherein said condenser has the back side facing toward said light source, the entire back side being formed with the cylindrical convex Fresnel lens surface, while the entire front side is formed with the concentric convex Fresnel lens surface.

13. The illuminating instrument according to claim 1, wherein said ligh source extends in a direction perpendicular to a cross-sectional plane containing the optical axis of said illuminating optical system.

14. In an illuminating instrument comprising a light source, a substantially semi-cylindrical reflector for reflecting the light emitted from said light source and a condenser arranged at an opening of said reflector, the improvement which comprises in that said condenser has front and back sides, one of said front and back sides being formed with a cylindrical convex Fresnel lens surface which functions to condense a light passing therethrough, in its longitudinal direction, and the other side being formed with concentric Fresnel lens surface.

15. The illuminating instrument according to claim 14 wherein said condenser has the back side facing toward said light source, the entire back side being formed with the cylindrical convex Fresnel lens surface, while the entire front side is formed with the concentric convex Fresnel lens surface.

16. In an illumination instrument comprising a light source, a substantially semi-cylindrical reflector for reflecting the light emitted from said light source and a condenser arranged at an opening of said reflector, wherein said condenser has front and back sides, one side of, said condenser opposed to said light source, formed with a lens surface having a configuration of a cylindrical convex Fresnel surface, said cylindrical convex Fresnel surface functioning to condense light passing therethrough, in its longitudinal direction, and the other side of said condenser being formed with a concentric Fresnel lens surface.

17. A flash unit comprising:
an elongated, substantially semi-cylindrical reflector;
a stroboscopic flashing tube arranged at a bottom of said reflector in parallel relation thereto; and
a condenser arranged at a front opening of said reflector, said condenser having front and back sides, one of said sides, opposed to said stroboscopic flashing tube, being formed with a cylindrical convex Fresnel lens surface, and said other side being formed with a concentric Fresnel lens surface, said condenser has the back side facing towards said light source, the entire back side being formed with the cylindrical convex Fresnel lens surface, while the entire front side is formed with the concentric convex Fresnel lens surface.

18. An illuminating instrument comprising:
a reflector composed of a combination of at least two elliptic reflecting surfaces each having an optic axis, the optic axes of said surfaces spaced from each other by a predetermined distance and each extending generally parallel to each other;
a light source having a center located between said two elliptic reflecting surfaces; and a condenser arranged at an opening of said reflector; and wherein the shapes of each of said elliptic reflecting surfaces are substantially identical to each other and are symmetrically arranged with respect to each other about said light source.

19. The illuminating instrument according to claim 18, wherein said condenser has front and back sides, one of said front and back sides formed with a cylindrical convex Fresnel lens surface which functions to condense light passing there through, in the longitudinal direction, the other side being formed with concentric Fresnel lens surface.

20. An illuminating instrument comprising:
a reflector composed of a combination of at least a part of two elliptic reflecting surfaces, said two elliptic reflecting surfaces being separated by a predetermined interval perpendicular to an illuminating optical system optic axis, said reflector defining a light emitting end and a non-light emitting end; and
a light source arranged to be located on the illuminating optical system optic axis, adjacent said non-light emitting end of said reflector, said light source being located near a focal point of each of said elliptic reflecting surfaces.

21. The illuminating instrument according to claim 20, wherein a spacing l between said elliptic reflecting surfaces satisfies the following condition with respect a diameter P of light emitted by said light source:

$$0.2P < l < 2P.$$

22. The illuminating instrument of claim 20, wherein a center of said light source coincides with a line centered between said focal point of each of said elliptic reflecting surfaces.

23. An illuminating instrument comprising:
a reflector composed of a combination of at least two elliptic reflecting surfaces each having an optic axis, the optic axes of said surfaces spaced from each other by a predetermined distance and each extending generally parallel to each other;
a light source having a center located between said two elliptic reflecting surfaces; and
wherein the shape of each of said elliptic reflection surfaces are substantially identical to each other and are symmetrically arranged with respect to each other about said light source.

* * * * *

UNITED STATES PATENT AND TRADEMARK OFFICE
CERTIFICATE OF CORRECTION

PATENT NO. : 5,160,192
DATED : November 3, 1992
INVENTOR(S) : S. SUGAWARA

It is certified that error appears in the above-indentified patent and that said Letters Patent is hereby corrected as shown below:

On the cover, in section [75], "Inventor", line 1, change "Yachiyo" to ---Chiba-ken---.

On the cover, in section [56], "References Cited", line 16, change "Castal" to ---Castel---.

At column 7, line 48 (claim 7, line 2) after "surfaces" insert ---have---.

At column 7, line 56 (claim 7, line 56) after "surfaces" insert ---have---.

At column 8, line 10 (claim 13, line 2) change "ligh" to ---light---

Signed and Sealed this

Twenty-eighth Day of November 1995

Attest:

BRUCE LEHMAN

*Attesting Officer*    *Commissioner of Patents and Trademarks*